United States Patent
Liang et al.

(10) Patent No.: US 7,119,300 B2
(45) Date of Patent: Oct. 10, 2006

(54) METHOD AND APPARATUS OF ASYNCHRONOUS ELECTRIC DISCHARGE MACHINE FOR WIRE CUT

(75) Inventors: Jui-Fang Liang, Hsinchu Hsien (TW); Chen-Fu Tsai, Hsinchu Hsien (TW); Chia-Pin Chen, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 188 days.

(21) Appl. No.: 10/383,109

(22) Filed: Mar. 7, 2003

(65) Prior Publication Data

US 2004/0124182 A1 Jul. 1, 2004

(30) Foreign Application Priority Data

Dec. 26, 2002 (TW) .................................. 91137539 A

(51) Int. Cl.
*B23H 7/04* (2006.01)

(52) U.S. Cl. .................. 219/69.12; 219/69.18
(58) Field of Classification Search ............. 219/69.12, 219/69.18, 69.13
See application file for complete search history.

(56) References Cited

U.S. PATENT DOCUMENTS

| 4,347,425 A | * | 8/1982 | Obara ..................... 219/69.13 |
| 4,447,713 A | * | 5/1984 | Tsurumoto et al. ....... 219/69.16 |
| 4,652,717 A | * | 3/1987 | Briffod et al. ........... 219/69.12 |
| 4,673,790 A | * | 6/1987 | Sawada et al. .......... 219/69.12 |

FOREIGN PATENT DOCUMENTS

| JP | 61-236427 A | * | 10/1986 |
| JP | 97525 A | * | 4/1989 |

* cited by examiner

*Primary Examiner*—Geoffrey S. Evans
(74) *Attorney, Agent, or Firm*—Birch, Stewart, Kolasch & Birch, LLP

(57) ABSTRACT

An apparatus of asynchronous electric discharge machine for wire cut adopted for use in machine industries employs a first electric discharge machine unit and a second electric discharge machine unit to provide electric energy to a cutting wire to generate alternate ignition and discharge on a work piece. The asynchronous operation uses two different discharge circuits in two different time sequences to reduce the probability of occurring discharge at the same spot and effectively reduce pause time, and prevent the cutting wire from rupturing, thereby to reduce production cost and improve operation efficiency.

15 Claims, 5 Drawing Sheets

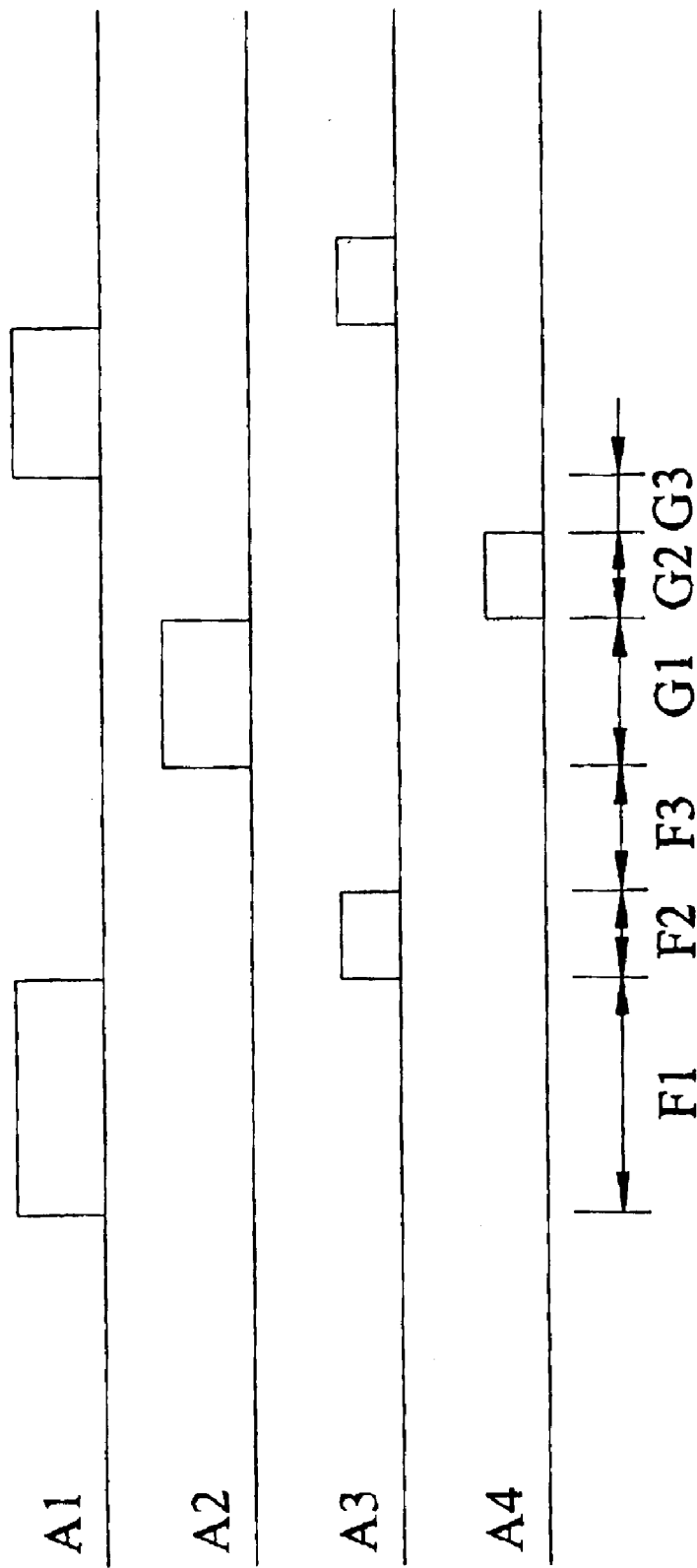

METHOD AND APPARATUS OF ASYNCHRONOUS ELECTRIC DISCHARGE MACHINE FOR WIRE CUT

FIELD OF THE INVENTION

The invention relates to an apparatus of electric discharge machine for wire cut adopted for use in machinery industries, particularly to an apparatus of asynchronous electric discharge machine for wire cut that performs machine operations alternately.

BACKGROUND OF THE INVENTION

Electric discharge machine is an indispensable machine method nowadays. Its basic principle is explained briefly as follows. The problems occurred at present also will be discussed.

In principle, electric discharge machine is a thermal machine method that converts electric energy to thermal energy of work pieces and rapidly melts the work pieces. In other words, in electric discharge machine an electric arc discharging phenomenon occurs through a machine liquid in a very close gap formed between the electrode and the work piece, and a heating effect takes place on the work piece to result in melting of the work piece. The work piece forms an electric discharge trace due to electric discharging. The process is repeatedly performed to fabricate a product forming a desired shape.

Refer to FIG. 1 for a conventional wire cut electric discharge machine apparatus. First, an ignition power supply device 11 provides the required power and connects to an upper machine guide 12 and a lower machine guide 13 in a parallel connection, and also connects to a work piece 14. A cutting wire 16 has two ends connecting respectively to the upper machine guide 12 and the lower machine guide 13 to establish electric connection. The upper machine guide 12 (or the lower machine guide 13), work piece 14 and cutting wire 16 form an ignition circuit. A main power supply device 15 is located between the upper machine guide 12 (or lower machine guide 13) and the work piece 14 to form a discharge circuit. An ignition switch 17 is provided to activate the ignition power supply device 11, for supplying electric power. Through the ignition circuit, an electric arc is generated between the cutting wire 16 and the work piece 14. Once the electric arc occurs, the ignition switch 17 is turned off and a main discharge switch 18 is activated. Through the main discharge circuit, the main power supply device 15 provides electric power, to produce an electric discharge machine phenomenon between the cutting wire 16 and the work piece 14. As a result, the work piece 14 generates heat and melts partially to form a required shape. Finally the main discharge switch 18 is turned off and pauses for a selected time period.

Refer to FIG. 2 for the time sequence of a conventional wire cut electric discharge apparatus. As shown in the drawing, electric power is supplied concurrently to the upper machine guide and the lower machine guide. The ignition time A of the upper machine guide and the ignition time B of the lower machine guide are synchronously activated at the ignition time E1. The discharge time C of the upper machine guide and the discharge time D of the lower machine guide also synchronously occur at discharge time E2. Then the process is stopped for a preset off time E3. After the work piece is insulated from the cutting wire, the foregoing machine process is repeated. Operation energy is simultaneously generated from the upper machine guide and the lower machine guide as follows:

$$E1 = (11+12) \times Vg$$

where E1 is energy, 11 is the electric current of the upper machine guide, 12 is the electric current of the lower machine guide, Vg is the voltage in the gap between the work piece and the cutting wire. Discharge power is as follows:

$$P1 = E1 \times F1$$

where P1 is the discharge power, F1 is the discharge frequency.

In conventional techniques for high speed machine, the detected discharge frequency is about 80 kHz, if the off time is set at 8 us. As every discharge must be followed by a waiting off time to recovery the discharge gap insulating again, shortening the off time can effectively increase the discharge frequency and improve machine efficiency.

SUMMARY OF THE INVENTION

The invention effectively reduces discharge off time and provides an apparatus of asynchronous electric discharge machine for wire cut, that alternately supplies electric power to the upper machine guide and the lower machine guide, for a significant reduction of discharge off time, an increase of discharge frequency, and for a higher cutting speed.

The invented apparatus of asynchronous electric discharge machine for wire cut mainly includes an ignition power supply device to provide electric energy required in the operations of the apparatus, a first electric discharge machine unit and a second electric discharge machine unit connecting to the ignition power supply device. The first electric discharge machine unit and the second electric discharge machine unit have respectively an upper machine guide and a lower machine guide connecting to a cutting wire. Through the ignition of an independent first ignition module and a second ignition module, the first electric discharge machine unit and the second electric discharge machine unit alternately generate electric arc discharge to the work piece, to melt the work piece and form a desired shape. The circuits for the two electric charges are different. Possible discharge at the same spot is greatly reduced. Machine off time shortens to 3 us is possible, and discharge frequency may increase to 133 Khz. Thus discharge frequency increases nearly 1.6 times. Because the invention adopts asynchronous discharge, and the current paths of the two discharges are different, the problems of conventional techniques that have the same discharge spot and a repeated electric arc discharge phenomenon may be prevented, and machine frequency greatly increases.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a time sequence control chart of the method of the asynchronous electric discharge machine apparatus for wire cut, according to the invention.

DESCRIPTION OF THE PREFERRED EMBODIMENT

Figure 3:
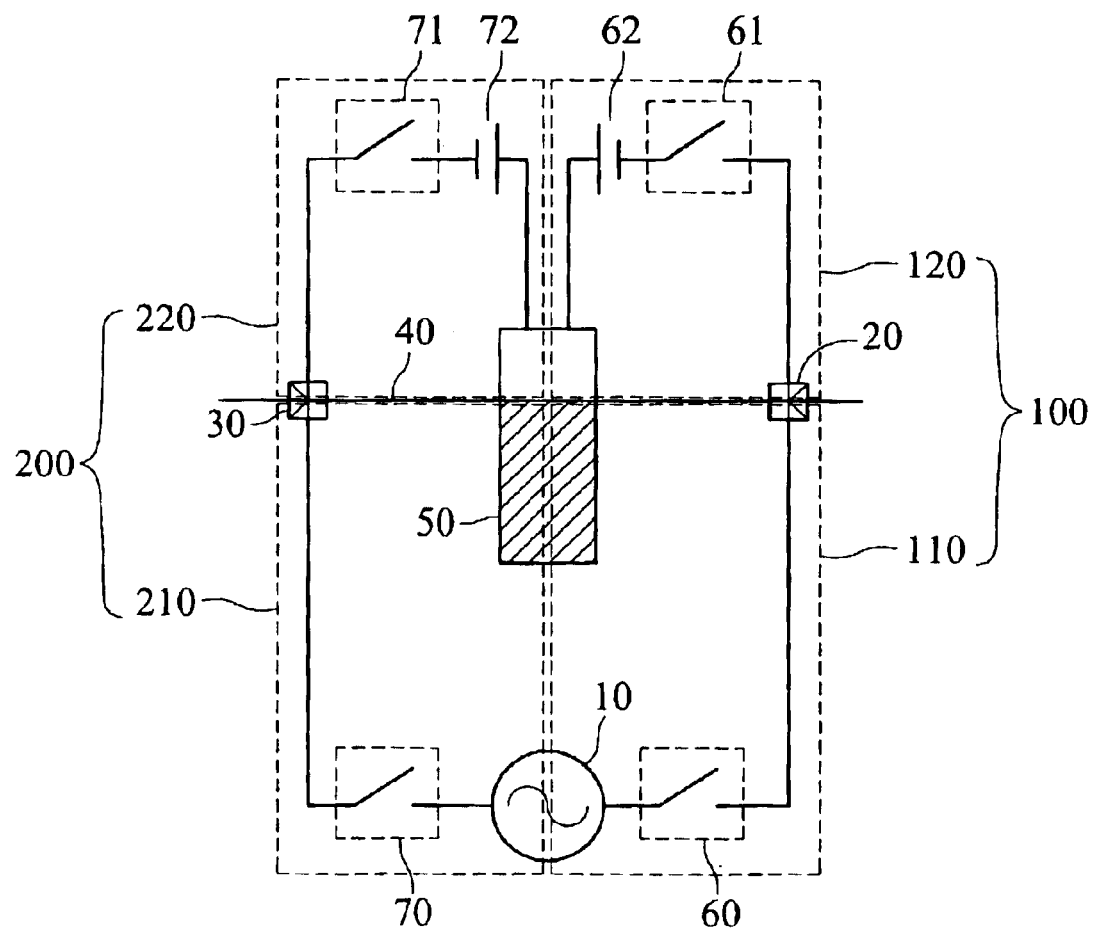
FIG. 3 is a schematic view of the asynchronous electric discharge machine apparatus for wire cut, according to the invention.

Referring to FIG. 3, the invented asynchronous electric discharge machine for wire cut has an ignition power supply device 10 to provide electric energy required for ignition, for activating electric discharge. It may be an AC or DC power supply device. There are a first electric discharge machine unit 100 and a second electric discharge machine unit 200 including respectively an upper machine guide 20 and a lower machine guide 30, connecting to the ignition power supply device 10 in a parallel connection. A cutting wire 40 is provided with two ends connecting respectively to the upper machine guide 20 and the lower machine guide 30, to establish a good electric connection. The cutting wire 40 generally is a copper wire or copper alloy wire with excellent conductivity. The first electric discharge machine unit 100 further includes a first ignition module 110 which has one end connecting to the upper machine guide 20, another end connecting to the ignition power supply device 10, and a first ignition switch 60. There is also a first main discharge module 120 which has one end connecting to the upper machine guide 20, another end connecting to a work piece 50, and a first discharge switch 61. There is a first power supply device 62 between the upper machine guide 20 and the work piece 50.

The second electric discharge machine unit 200 is constructed like the first electric discharge machine unit 100. It includes a second ignition module 210 with one end connecting to the lower machine guide 30, another end connecting to the ignition power supply device 10, and a second ignition switch 70. There is a second main discharge module 220 which has one end connecting to the lower machine guide 30, another end connecting to the work piece 50, and a second discharge switch 71. There is a second power supply device 72 between the lower machine guide 20 and the work piece 50.

Figure 4A:
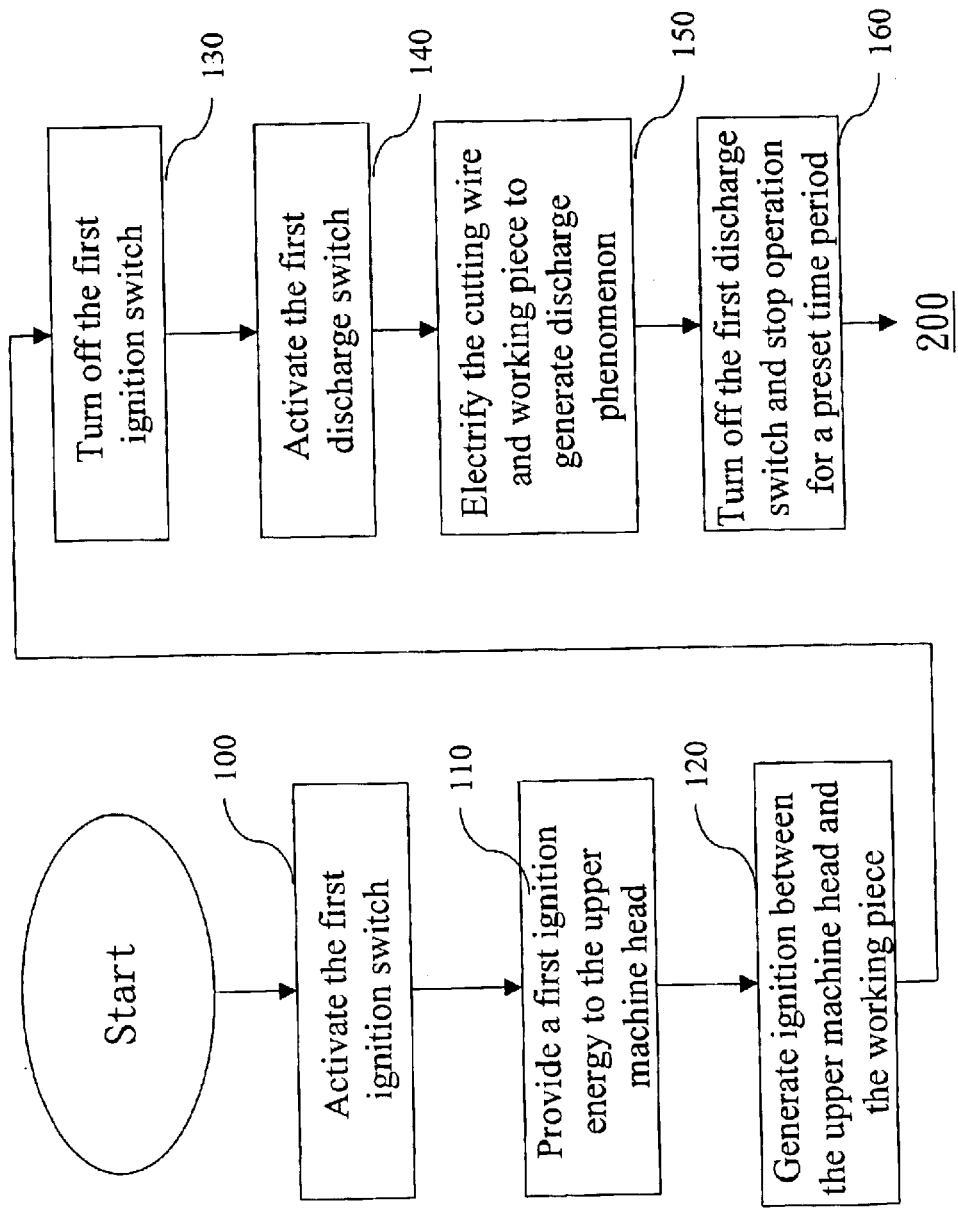
FIGS. 4A and 4B are process flow charts of the method of the asynchronous electric discharge machine apparatus for wire cut, according to the invention.
Figure 4B:
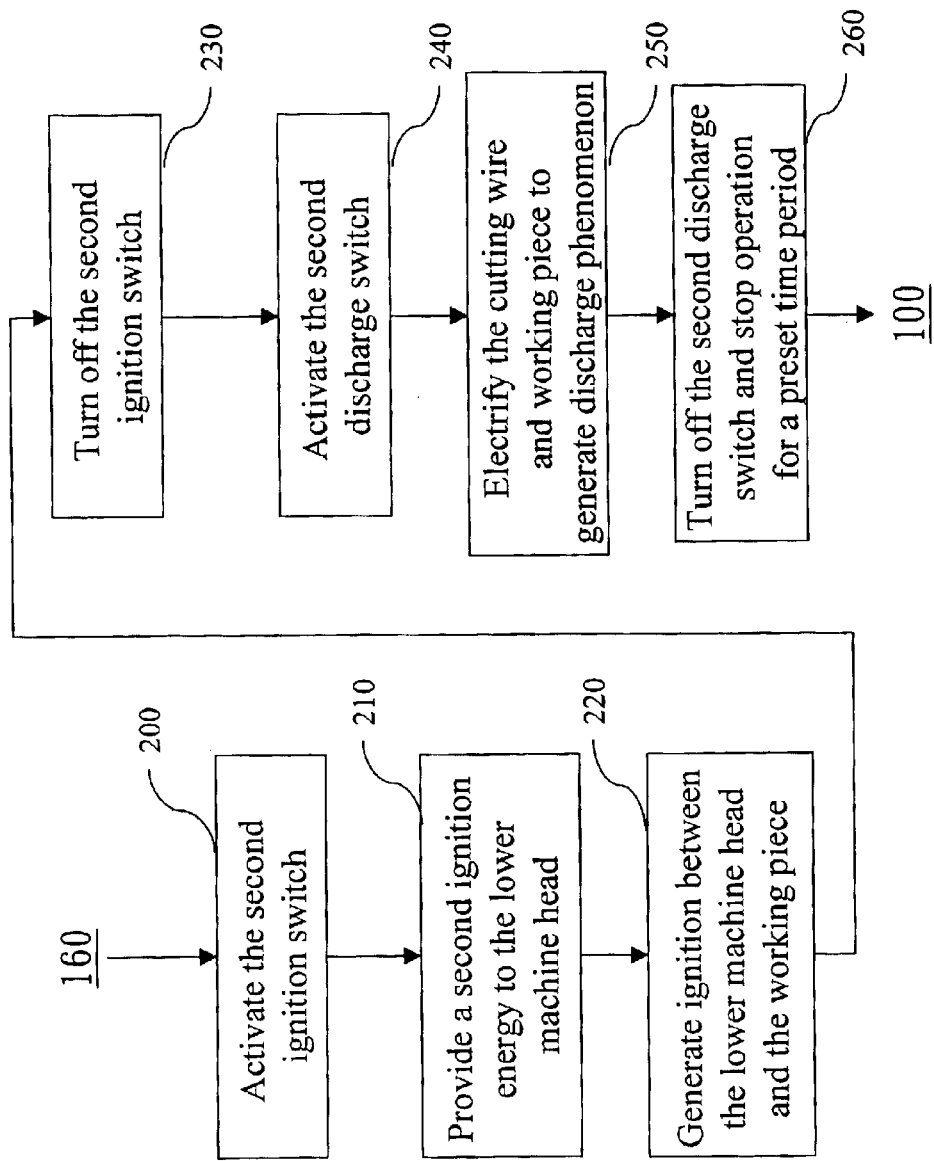

Refer to FIGS. 4A and 4B for the process of the invention. First, activate the first ignition switch (step 100) to enable the ignition power supply device to provide a first ignition energy to the upper machine guide (step 110), and to generate ignition between the upper machine guide and the work piece (step 120); turn off the first ignition switch after the ignition has taken place (step 130); activate the first discharge switch (step 140); provide electric energy through the first power supply device and generate discharge between the cutting wire and the work piece through the connection of the upper machine guide, and process cutting machine on the work piece for a selected time period (step 150); immediately turn off the first discharge switch and stop operation for a preset time period (step 160); then stop the operation of the first electric discharge machine unit, and the second electric discharge machine unit takes over and continues the operation. First, activate the second ignition switch (step 200) to enable the ignition power supply device to provide a second ignition energy to the lower machine guide (step 210), and to generate ignition between the lower machine guide and the work piece (step 220); turn off the second ignition switch while the ignition takes place (step 230); activate the second discharge switch (step 240); provide electric energy through the second power supply device and generate discharge between the cutting wire and the work piece through the connection of the lower machine guide, and process cutting machine on the work piece for a selected time period (step 250); turn off the second discharge switch and stop operation for a preset time period (step 260). Repeat the processes from step 100 to step 260 until the product is formed in the desired shape.

Figure 1:
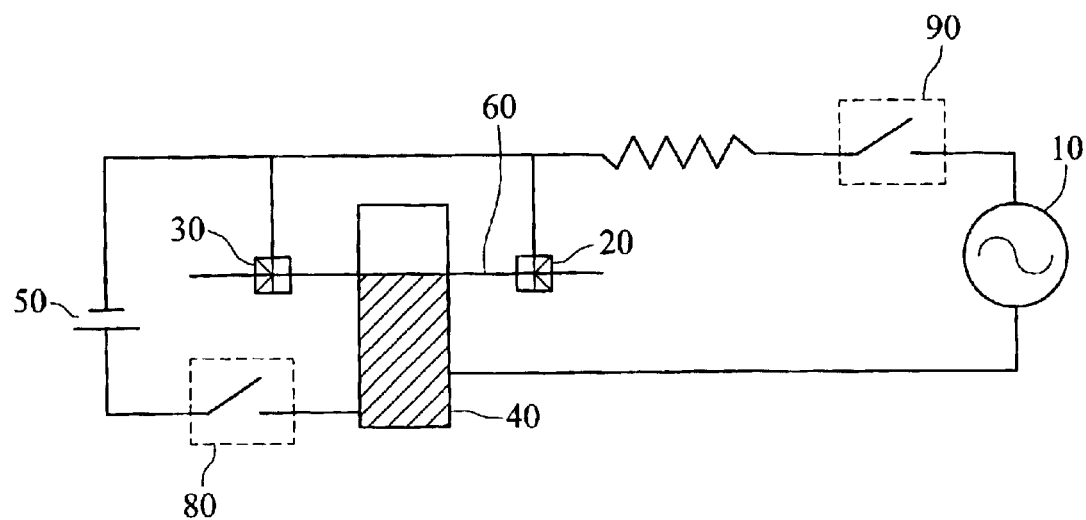
FIG. 1 is a schematic view of a conventional electric discharge apparatus for wire cut.
Figure 2:
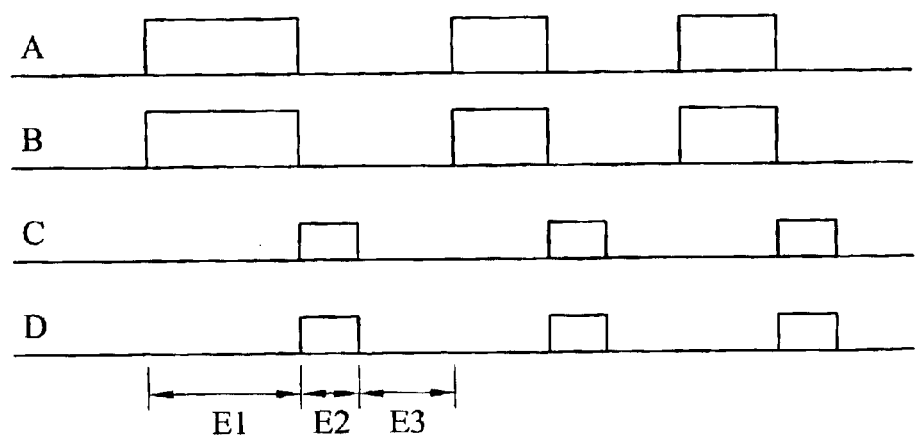
FIG. 2 is a schematic view of the timing chart of a conventional electric discharge apparatus for wire cut.

Refer to FIG. 5 for the time sequence control of the method of the asynchronous electric arc machine apparatus for wire cut according to the invention. Comparing FIG. 2 with FIG. 5, it shows that the ignition time A1 of the upper machine guide is executed for a period of the first ignition time F1 (this time period is to initiate the discharge, the time duration cannot be precisely controlled); next, proceed the discharge time A3 of the upper machine guide for a preset duration of the first discharge time period F2; then stop the operation for a preset duration of the first off time period F3. Then immediately, the ignition time A2 of the lower machine guide is proceeded for a selected time period after the second ignition time G1 is activated, and the discharge time A4 at the lower machine guide proceeds for a preset duration of the second discharge time period G2; finally, stop the operation for a preset duration of the second off time period G3. The aforesaid steps are repeatedly executed for machine operations on the work piece. The invention is an asynchronous process that is different from the conventional process of synchronous ignition and discharge. Furthermore, the energy supplied by the invention is as follows:

$$E3 = I3 \times Vg$$

I3 is the electric current of the upper machine guide or the lower machine guide, or may be adjusted as the sum of the electric current of the conventional upper machine guide and lower machine guide. Therefore, the energy obtained is the same as the energy obtained by a conventional one. The operation power is:

$$P3 = E3 \times F3$$

P3 is the discharge power, F3 is the discharge frequency.

The invention aims to provide alternate and asynchronous discharge for the upper machine guide and the lower machine guide. Hence the current paths of the first discharge and the second discharge are different. As a result, the off time is shorter than the off time of conventional techniques. It prevents discharge at the same spot or a repetitive arc discharge effectively, and avoids rupture of the cutting wire.

In summary, the invented method and apparatus of asynchronous electric discharge machine for wire cut employs independent ignition modules and main discharge modules to generate ignition discharge alternately, for melting the work piece, processing cutting machine. The current paths of two discharges are different. Thus the off time is much shorter than the off time used by conventional machine, and operation efficiency increases greatly. In addition, continuous discharge on the same spot is avoided, rupture of the cutting wire is prevented, and the service life of the cutting wire increases.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments not departing from the spirit and scope of the invention.

What is claimed is:

1. An apparatus of asynchronous electric discharge machine for wire cut for machining a work piece, comprising:
   a cutting wire;
   a first electric discharge machine unit including an upper machine guide connecting to one end of the cutting wire to generate an ignition discharge to perform cutting machine for the work piece;
   a second electric discharge machine unit including a lower machine guide connecting to another end of the cutting wire to generate another ignition discharge to perform cutting machine for the work piece; and
   an ignition power supply device connecting to the first electric discharge machine unit and the second electric discharge machine unit to provide energy required for generating ignition operation;
   wherein the first electric discharge machine unit and the second electric discharge machine unit alternately perform machine for the work piece to prevent the ignition discharge from occurring on a same spot of the work piece and resulting in rupturing of the cutting wire;
   wherein at least one of the first electric discharge machine unit and the second electric discharge machine unit further includes a first ignition module which has one end connecting to the ignition power supply device and another end connecting to the upper machine guide to generate an ignition.

2. The apparatus of asynchronous electric discharge machine for wire cut of claim 1, wherein the first electric discharge machine unit further includes a first main discharge module which has one end connecting electrically to the upper machine guide and another end connecting to the work piece to generate a discharge between the upper machine guide and the work piece.

3. The apparatus of asynchronous electric discharge machine for wire cut of claim 2, wherein the first main discharge module includes a first power supply device located between the first main discharge module and the upper machine guide to provide required energy to drive the first main discharge module.

4. The apparatus of asynchronous electric discharge machine for wire cut of claim 1, wherein the second electric discharge machine unit further includes a second main discharge module which has one end connecting electrically to the lower machine guide and another end connecting to the work piece to generate a discharge between the lower machine guide and the work piece.

5. The apparatus of asynchronous electric discharge machine for wire cut of claim 4, wherein the second main discharge module includes a second power supply device located between the second main discharge module and the lower machine guide to provide required energy to drive the second main discharge module.

6. The apparatus of asynchronous electric discharge machine for wire cut of claim 1, wherein the cutting wire is selectively a copper wire or a copper alloy wire.

7. A method of asynchronous electric discharge machine for wire cut accomplished through a cutting wire anchoring on an upper machine guide and a lower machine guide for machining work piece, comprising steps of:
   a. providing a first ignition energy to the upper machine guide;
   b. processing electric discharge cutting machine on the work piece through the upper machine guide and the cutting wire;
   c. suspending operations for a preset time period;
   d. providing a second ignition energy to the lower machine guide;
   e. providing both a DC power supply and a AC power supply; and
   f. processing electric discharge cutting machine on the work piece through the lower machine guide and the cutting wire;
   wherein the ignition power supply device is selected from the DC power supply or the AC power supply.

8. The method of claim 7, wherein step a further includes steps of activating a first ignition switch and a first discharge switch.

9. The method of claim 7, wherein step a is followed by generating an ignition between the upper machine guide and the work piece.

10. The method of claim 7, wherein step b further includes a step of turning off the first ignition switch.

11. The method of claim 7, wherein step d further includes steps of activating a second ignition switch and a second discharge switch.

12. The method of claim 7, wherein step d is followed by generating an ignition between the lower machine guide and the work piece.

13. The method of claim 7, wherein step f further includes a step of turning off the second ignition switch.

14. The method of claim 7, wherein step f is followed by a step g of suspending operations for a preset time period.

15. The method of claim 14 further including repeating at least once from step a through step g.

* * * * *